UNITED STATES PATENT OFFICE.

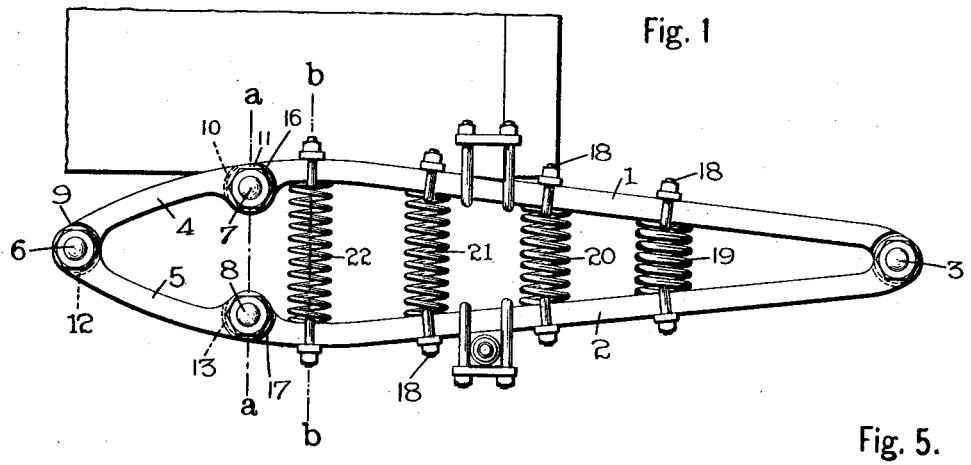

THOMAS J. MAGNER, OF OLEAN, NEW YORK; GEORGE A. LARKIN ADMINISTRATOR OF SAID MAGNER, DECEASED.

VEHICLE-SPRING.

1,033,429.         Specification of Letters Patent.     Patented July 23, 1912.

Application filed October 12, 1910. Serial No. 586,778.

*To all whom it may concern:*

Be it known that I, THOMAS J. MAGNER, a citizen of the United States, residing at Olean, in the county of Cattaraugus and State of New York, have invented new and useful Improvements in Vehicle-Springs, of which the following is a specification.

This invention relates to improvements in spring structures for vehicles, and it consists of two bars which are separated from each other, extend in the same general direction, and are attached respectively to the axle and body of the vehicle, and springs interposed between and fastened to said bars, the ends of the bars being hinged or pivotally connected to each other, and at least one of said hinged or pivotal connections being in the form of a toggle to permit a limited range of vertical movement which prevents horizontal movement.

The principal objects of the invention are to produce an extremely strong, durable and reliable structure of comparatively cheap and simple construction, having but few parts, and possessing great resiliency.

Other objects and advantages, together with certain details of construction will be hereinafter described and perhaps claimed, reference being had to the accompanying drawings in which two adaptations of the invention are shown.

Figure 1 is a side elevation of one adaptation or form of the invention, also showing a fragment of a vehicle to which the spring structure is connected. Figs. 2 and 3 are detached views of the two members or links of a toggle. Fig. 4 is an enlarged vertical section on line *a a* Fig. 1, through the hinge structure. Fig. 5 is an enlarged transverse section on line *b b* Fig. 1. Fig. 6 is a side elevation of another adaptation of the invention.

In referring to the drawings in detail, like numerals designate like parts.

In the form or adaptation of the invention shown in Fig. 1, the spring structure consists of two bars 1 and 2 which extend in the same general direction and are separated a suitable distance from each other, being arranged one above the other and having direct connection with each other at one end, a pivot pintle 3 for directly connecting said bars together at their contacting ends, a toggle for connecting the opposite separated ends of said bars, and a series of coiled springs interposed between said bars and fastened at their respective ends to the bars. The toggle comprises two links or members 4 and 5, and a pivot pintle 6 for securing the contacting ends of the links or members together. The inner ends of the links or members 4 and 5 are respectively pivoted to the inner or separated ends of the bars 1 and 2 by pintles 7 and 8. In order to secure a construction possessing extraordinary strength sufficient to resist great lateral strain, the links or members 4 and 5 of the toggle are connected to each other and to the ends of the bars 1 and 2 by interlocking tongues and grooves in addition to their pivotal connection.

Referring to Figs. 2 and 3, it will be noted that the link or member 4 is provided at one end with a central longitudinally extending reduced portion or tongue 9 and at the opposite end with a central or longitudinal groove or slot 10 which provides an end forked or bifurcated portion 11, and that the link or member 5 is provided at both of its ends with central longitudinal grooves or slots 12 and 13 which form forked or bifurcated portions 14 and 15 at the two opposite ends of said member 5. In the construction shown the tongue 9 of the link or member 4 is fitted in the groove or slot 12 of the link of member 5 being secured in interlocked position between the end forks 14 of said member 5 by the pivot pintle 6. The inner ends of the bars 1 and 2 are likewise provided with central longitudinally extending reduced portions or tongues 16 and 17 which are respectively fitted in the grooves or slots 10 and 13 in the ends of the members 4 and 5, and are secured in interposed and interlocked position between the forks of the bifurcated end portions 11 and 15 of the said members or links 4 and 5 by the pivot pintles 7 and 8. The springs employed are preferably of a coil form, and are interposed in vertical position between, and are fastened at their respective upper and lower ends to the bars 1 and 2 by any suitable means, such, for instance, as the clips 18, shown in Fig. 1.

While four coil springs 19, 20, 21 and 22 are shown in interposed position between the bars 1 and 2 in Fig. 1 of the accompanying drawings, it should be understood that more or less than that number may be used if desired. It will be noted that the coil springs vary in length according to their arrangement between the bars 1 and 2, this is due to the fact that the bars extend at an angle to each other and gradually diverge or separate from each other from their direct pivoting point at one end to their juncture with the toggle links or members at the opposite end. It will also be noted that the shortest spring 19 is the nearest to the direct pivoted end of the bars 1 and 2 and that the springs increase in length according to their arrangement and location. The strength and stiffness of the springs also varies, the longest spring 22 being the weakest and most resilient, and being arranged to receive the initial strain of the shock, and the shortest spring 19 being the stiffest with the other springs graded progressively in strength and stiffness and arranged to take up and support the load after the spring 22 has been placed under a certain degree of tension. The object of this construction is to enable the spring structure to be utilized with loads of different weight and also provide a very resilient structure.

In the other form of the invention shown in Fig. 6, two bars 23 and 24 are arranged in horizontal parallel separated position, one above the other, and a double toggle is employed to connect both ends of the bars to each other. Each of the double toggles consists of four members or links 25, 26, 27, and 28 pivotally connected together at their ends by pintles 29, 30, 31 and 32. These double toggles have their members or links arranged in approximately a diamond shape as shown in the drawings. The opposite ends of the bars 23 and 24 are pivoted respectively to the upper and lower connected ends of the members or links by the pintles 29 and 31, so that the same pintles serve to pivot the links or members to each other and also to pivotally connect the toggles to the bars 23 and 24. Spiral springs 33 and 34 are arranged between the opposite outer ends of the bars 23 and 24 and are located centrally and vertically between the members or links of the double toggles. Spiral springs are also arranged between those portions of the bars 23 and 24 between the double toggles, and as these springs are of similar size and form they are designated by a single numeral 35. The springs shown in Fig. 6 are fastened at their respective upper and lower ends to the bars 23 and 24 by bending the spring ends so as to extend vertically fitting said vertical ends 36 through openings in the bars and securing them rigidly in place by the lock nuts 37. The form or adaptation of the invention shown in Fig. 6, owing to the double toggle arrangement possesses immense strength and extraordinary ability to resist lateral strain, and is chiefly adapted to be utilized in large and heavy vehicles for transporting very heavy loads.

The parts or elements of this improved structure may be rearranged, modified or changed, or some may be altogether omitted within the scope of the following claim, without departing from my invention.

I claim.

A spring device of the class described, consisting of two elongated curved rigid bars which extend approximately in the same general direction, are separated from and curve toward each other and are attached to the axle and body of the vehicle respectively, means movably connecting said bars at each end, and at least one of said movable connections being of toggle form to permit the bars to move relatively to each other, and coil springs interposed at different points and in vertical position between said bars and fastened at their respective ends to said bars.

THOMAS J. MAGNER.

Witnesses:
L. M. SANGSTER,
GEORGE A. NEUBAUER.

---

Copies of this patent may be obtained for five cents each, by addressing the "Commissioner of Patents, Washington, D. C."